(12) United States Patent
Atqiaee et al.

(10) Patent No.: US 11,679,657 B1
(45) Date of Patent: Jun. 20, 2023

(54) ELECTRIC DRIVE UNIT AND DRIVE AXLE SYSTEM

(71) Applicant: ArvinMeritor Technology, LLC, Troy, MI (US)

(72) Inventors: Arash Atqiaee, Troy, MI (US); James Derderian, Troy, MI (US); Dan S. Ursu, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/751,126

(22) Filed: May 23, 2022

(51) Int. Cl.
| | |
|---|---|
| *B60K 1/00* | (2006.01) |
| *B60K 17/22* | (2006.01) |
| *F16H 57/02* | (2012.01) |
| *B60K 17/16* | (2006.01) |
| *F16H 57/021* | (2012.01) |
| *F16H 57/037* | (2012.01) |
| *F16H 57/04* | (2010.01) |

(52) U.S. Cl.
CPC .............. *B60K 1/00* (2013.01); *B60K 17/165* (2013.01); *B60K 17/22* (2013.01); *F16H 57/021* (2013.01); *F16H 57/037* (2013.01); *F16H 57/0423* (2013.01); *F16H 57/0436* (2013.01); *F16H 57/0471* (2013.01); *B60K 2001/001* (2013.01); *F16H 2057/02034* (2013.01); *F16H 2057/02052* (2013.01)

(58) Field of Classification Search
CPC ........ B60K 1/00; B60K 17/165; B60K 17/22; B60K 2001/001; F16H 57/021; F16H 57/037; F16H 57/0423; F16H 57/0436; F16H 57/0471; F16H 2057/02034; F16H 2057/02052
USPC ......................................................... 475/150
See application file for complete search history.

(56) References Cited

U.S. PATENT DOCUMENTS

| | | | |
|---|---|---|---|
| 11,273,700 B2 | 3/2022 | Garcia et al. | |
| 2002/0083785 A1* | 7/2002 | Lamela | F16H 3/093 74/331 |
| 2009/0318255 A1* | 12/2009 | Kato | B60K 1/00 903/910 |
| 2013/0283972 A1* | 10/2013 | Yamamoto | B60K 6/405 903/902 |
| 2016/0265652 A1* | 9/2016 | Nishimine | B60K 6/365 |
| 2017/0314623 A1* | 11/2017 | Schilling | B60K 17/36 |

\* cited by examiner

*Primary Examiner* — Colby M Hansen
(74) *Attorney, Agent, or Firm* — Brooks Kushman PC

(57) ABSTRACT

An electric drive unit and a drive axle system having an electric drive unit. The drive axle system also includes a drive shaft and an axle assembly that that is remotely positioned from the electric drive unit. The drive shaft operatively connects the electric drive unit to the axle assembly.

20 Claims, 9 Drawing Sheets

ELECTRIC DRIVE UNIT AND DRIVE AXLE SYSTEM

TECHNICAL FIELD

This relates to an electric drive unit and a drive axle system having an electric drive unit.

BACKGROUND

An axle assembly having an electric motor module is disclosed in U.S. Pat. No. 11,273,700.

SUMMARY

In at least one embodiment a drive axle system is provided. The drive axle system includes an electric drive unit, an axle assembly, and a drive shaft. The electric drive unit includes an electric motor, a first shaft, a transmission, a second shaft, and a drop gear set. The electric motor has a rotor. The rotor is rotatable about a rotor axis. The first shaft is rotatable about the rotor axis. The transmission operatively connects the rotor and the first shaft. The second shaft is rotatable about a second shaft axis. The second shaft axis differs from the rotor axis. The drop gear set has a first gear and a second gear. The first gear is rotatable about the rotor axis with the first shaft. The second gear meshes with the first gear and is rotatable about the second shaft axis with the second shaft. The axle assembly is remotely positioned from the electric drive unit. The axle assembly includes an axle housing assembly. The axle housing assembly receives a differential assembly. The axle assembly includes a drive pinion. The drive pinion meshes with a ring gear of the differential assembly. The drive shaft operatively connects the second shaft to the drive pinion.

The electric drive unit may have a housing assembly. The housing assembly may receive the electric motor, the first shaft, the transmission, the second shaft, the drop gear set, or combinations thereof.

The drive shaft may be disposed outside of the housing assembly of the electric drive unit. The drive shaft may be disposed outside of the axle housing assembly of the axle assembly.

The electric drive unit may be received in an engine compartment of the vehicle. The axle assembly may be disposed rearward of the engine compartment.

A coupling may be fixedly disposed on the second shaft. The coupling may be disposed outside of the housing assembly of the electric drive unit.

The electric motor may be positioned along the rotor axis between the transmission and the drop gear set.

The housing assembly may include a support housing. The support housing may be encircled by the rotor. The support housing may receive the first shaft. The support housing may include a tubular portion. The tubular portion may encircle the first shaft. The support housing may have a mounting flange. The mounting flange may extend from an end of the tubular portion in a direction that extends away from the rotor axis. The rotor may be rotatably disposed on the tubular portion.

The tubular portion may include a first internal wall. The first internal wall may extend toward the rotor axis. The first internal wall may define a first rotor opening. The first rotor opening may receive a bearing. The bearing may receive and rotatably support the first shaft.

The tubular portion may include a second internal wall. The second internal wall may extend toward the rotor axis. The second internal wall may be remotely positioned from the first internal wall. The second internal wall may define a second opening. The second opening may receive a seal. The seal may extend from the second internal wall to the first shaft.

The housing assembly may include a first drop gear housing. The housing assembly may include a second drop gear housing. The first drop gear housing and the second drop gear housing may cooperate to define a gear cavity. The gear cavity may receive the first gear and the second gear.

A first bearing assembly may rotatably support the first shaft. The second bearing assembly may rotatably support the first shaft. The first gear may be positioned along the rotor axis between the first bearing assembly and the second bearing assembly. The first bearing assembly may be mounted to the first drop gear housing. The second bearing assembly may be mounted to the second drop gear housing.

A first bearing assembly may rotatably support the second shaft. The second bearing assembly may rotatably support the second shaft. The second gear may be positioned along the second shaft axis between the first bearing assembly and the second bearing assembly. The first bearing assembly may be mounted to the first drop gear housing. The second bearing assembly may be mounted to the second drop gear housing.

The first drop gear housing and the second drop gear housing may cooperate to define a sump portion. The sump portion may receive lubricant.

The electric drive unit may have a lubricant pump. The lubricant pump may be driven by the first shaft. The lubricant pump may pump lubricant from the sump portion to a first end plate. The first end plate may be mounted to the second drop gear housing.

A conduit may be fluidly connected to the sump portion. The conduit may extend outside of the housing assembly. The conduit may extend to the first end plate.

The lubricant pump may pump lubricant through a passage in the first end plate. The lubricant pump may pump lubricant through the passage in the first end plate to a passage in the second drop gear housing assembly. The lubricant pump may pump lubricant through the passage in the second drop gear housing assembly to a passage in the first drop gear housing assembly. The passage in the first drop gear housing assembly may provide lubricant to the first bearing assembly. The passage in the first drop gear housing assembly may provide lubricant to a first chamber that is disposed inside the support housing. The first chamber may be at least partially defined by the first internal wall and the second internal wall.

The support housing may at least partially define a second chamber. The second chamber is disposed between the second internal wall and the first drop gear housing. Lubricant may flow from the transmission and through the second chamber to reach the sump portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
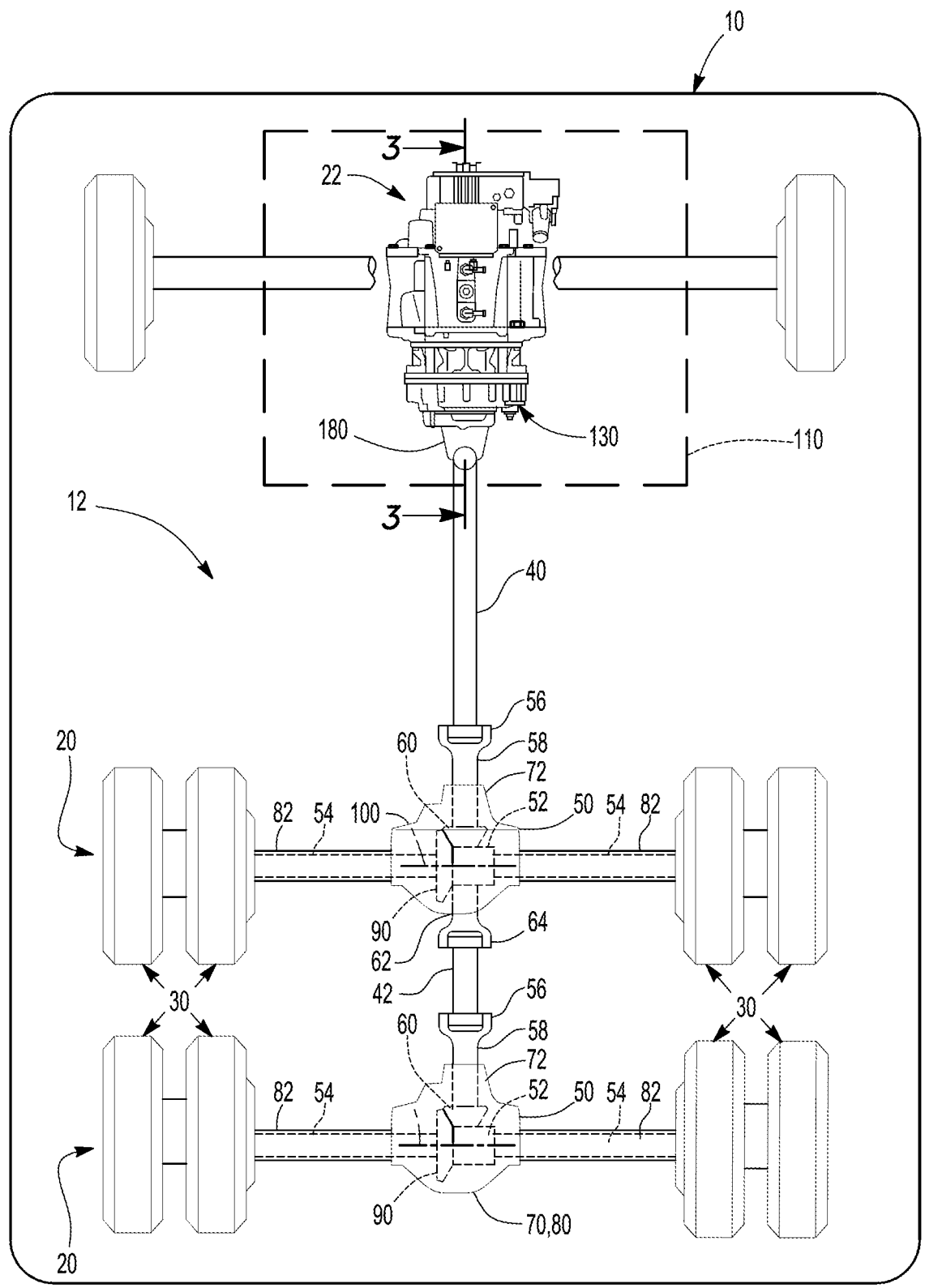
FIG. 1 is a depiction of an example of a drive axle system having an electric drive unit.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 may have a drive axle system 12 that may include one or more axle assemblies 20 and an electric drive unit 22.

An axle assembly 20 may provide torque to one or more wheel assemblies 30 that may be rotatably supported on the axle assembly 20. A wheel assembly 30 may include a tire disposed on a wheel. In FIG. 1, two axle assemblies are shown in a tandem axle configuration, although it is contemplated that a greater or lesser number of axle assemblies may be provided. In a tandem configuration, a front axle assembly is connected in series with a rear axle assembly. The front axle assembly may be operatively connected to the electric drive unit 22, such as with a drive shaft 40. The drive shaft 40 is disposed outside of an axle housing assembly 50 of the axle assembly 20 and outside of a housing assembly 130 of the electric drive unit 22. An output of the front axle assembly may be coupled to an input of the rear axle assembly, such as with a shaft like a prop shaft 42. The prop shaft 42 may be coupled to an output of the front axle assembly and an input of the rear axle assembly at opposing ends via couplings, such as universal joints, that may allow the front axle assembly and the rear axle assembly to move with respect to each other while allowing the prop shaft 42 to rotate.

The axle assembly 20 or axle assemblies are remotely positioned from or completely spaced apart from the electric drive unit 22. In the example shown, an axle assembly 20 may include an axle housing assembly 50, a differential assembly 52, a pair of axle shafts 54, an input yoke 56, an input shaft 58, and a drive pinion 60. In a tandem axle arrangement, the front axle assembly 20 may also include an output shaft 62 and an output yoke 64.

The axle housing assembly 50 receives various components of the axle assembly 20. In addition, the axle housing assembly 50 may facilitate mounting of the axle assembly 20 to the vehicle 10, such as via a suspension subsystem. In at least one configuration, the axle housing assembly 50 may include an axle housing 70 and a differential carrier 72.

The axle housing 70 may receive and support the axle shafts 54. In at least one configuration, the axle housing 70 may include a center portion 80 and at least one arm portion 82.

The center portion 80 may be disposed proximate the center of the axle housing 70. The center portion 80 may define a cavity that may receive the differential assembly 52. A lower region of the center portion 80 may at least partially define a sump portion that may contain lubricant 84 that may lubricate components of the axle assembly 20.

One or more arm portions 82 may extend from the center portion 80. For example, two arm portions 82 may extend in opposite directions from the center portion 80 and away from the differential assembly 52. The arm portions 82 may have similar configurations. For example, the arm portions 82 may each have a hollow configuration or tubular configuration that may extend around and may receive a corresponding axle shaft 54 and may help separate or isolate the axle shaft 54 from the surrounding environment. An arm portion 82 or a portion thereof may be integrally formed with the center portion 80 or may be separate from the center portion 80.

The differential carrier 72 may be mounted to the center portion 80 of the axle housing 70. The differential carrier 72 may support the differential assembly 52 such that differential assembly 52 is rotatable with respect to the differential carrier 72.

The differential assembly 52 facilitates the transmission of torque to the wheel assemblies 30 and permits the wheel assemblies 30 of a corresponding axle assembly 20 to rotate at different velocities in a manner known by those skilled in the art. The differential assembly 52 may be disposed in the center portion 80 of the axle housing assembly 50. For example, the differential assembly 52 may have a ring gear 90 that may be fixedly mounted on a differential case. The ring gear 90 and the differential case may be rotatable about a differential axis 100. The differential case may receive differential gears that may be operatively connected to the axle shafts 54. Torque that is provided to the drive pinion 60 may be transmitted to the ring gear 90. As such, the differential assembly 52 may receive torque via the ring gear 90 and provide torque to the axle shafts 54 and to its associated wheel assemblies 30 via the differential case and the differential gears.

The axle shafts 54 are configured to transmit torque from an associated differential to corresponding wheel assemblies 30. For example, two axle shafts 54 may be provided such that each axle shaft 54 extends through a different arm portion 82 of axle housing 70. Each axle shaft 54 may extend along and may be rotatable about an axis. For instance, the axle shafts 54 may be rotatable about different axes or a common axis, such as the differential axis 100.

The input yoke 56 facilitates coupling of an axle assembly 20 to a shaft, such as the drive shaft 40 or the prop shaft 42. The input yoke 56 may be mounted on the input shaft 58 and may rotate with the input shaft 58.

The input shaft 58 is operatively connected to the drive pinion 60. The input shaft 58 may extend along and may be rotatable about an axis that differs from the differential axis 100.

The drive pinion 60 facilitates the transmission of torque between the input shaft 58 and the differential assembly 52. The drive pinion 60 may extend along and may be configured to rotate about the same axis as the input shaft 58 or may be rotatable about a different axis. The drive pinion 60 may be rotatably supported by one or more roller bearing assemblies that may be disposed on the differential carrier 72. The drive pinion 60 may include a gear portion that has a plurality of teeth that may mesh or mate with corresponding teeth on the ring gear 90.

The output shaft 62 facilitates the transmission of torque from one axle assembly to another. In the configuration shown in FIG. 1, an output shaft 62 is provided with the front axle assembly but not the rear axle assembly. The output shaft 62 is rotatable about an axis and may be supported by one or more roller bearings that may be disposed on the axle housing assembly 50. Optionally, the output shaft 62 may extend through the drive pinion 60. The output shaft 62 may be fixedly coupled to the output yoke 64.

The output yoke 64 facilitates coupling of the output shaft 62 to the prop shaft 42. The output yoke 64 may be mounted on the output shaft 62 and may rotate with the output shaft 62.

Referring to FIG. 1, the electric drive unit 22 may provide torque to one or more axle assemblies 20. In addition, the electric drive unit 22 may receive torque from one or more axle assemblies 20 and function as a generator that may charge an electrical power source, such as a battery. The electric drive unit 22 is remotely positioned from the axle assemblies 20. As such, the electric drive unit 22 is not mounted to an axle assembly 20 and does not contact the axle assemblies 20. In at least one configuration, the electric drive unit 22 may be received in an engine compartment 110 of the vehicle 10 while the axle assembly 20 may be disposed rearward of the engine compartment 110. For instance, the electric drive unit 22 may be configured to replace an internal combustion engine in a vehicle that was originally outfitted with an internal combustion engine. It is also contemplated that the electric drive unit 22 may be disposed in a location other than the engine compartment. For example, the electric drive unit 22 may be disposed wherever there is sufficient packaging space on the vehicle 10 and may be disposed further rearward or closer to the axle assemblies 20 than illustrated.

Figure 2:
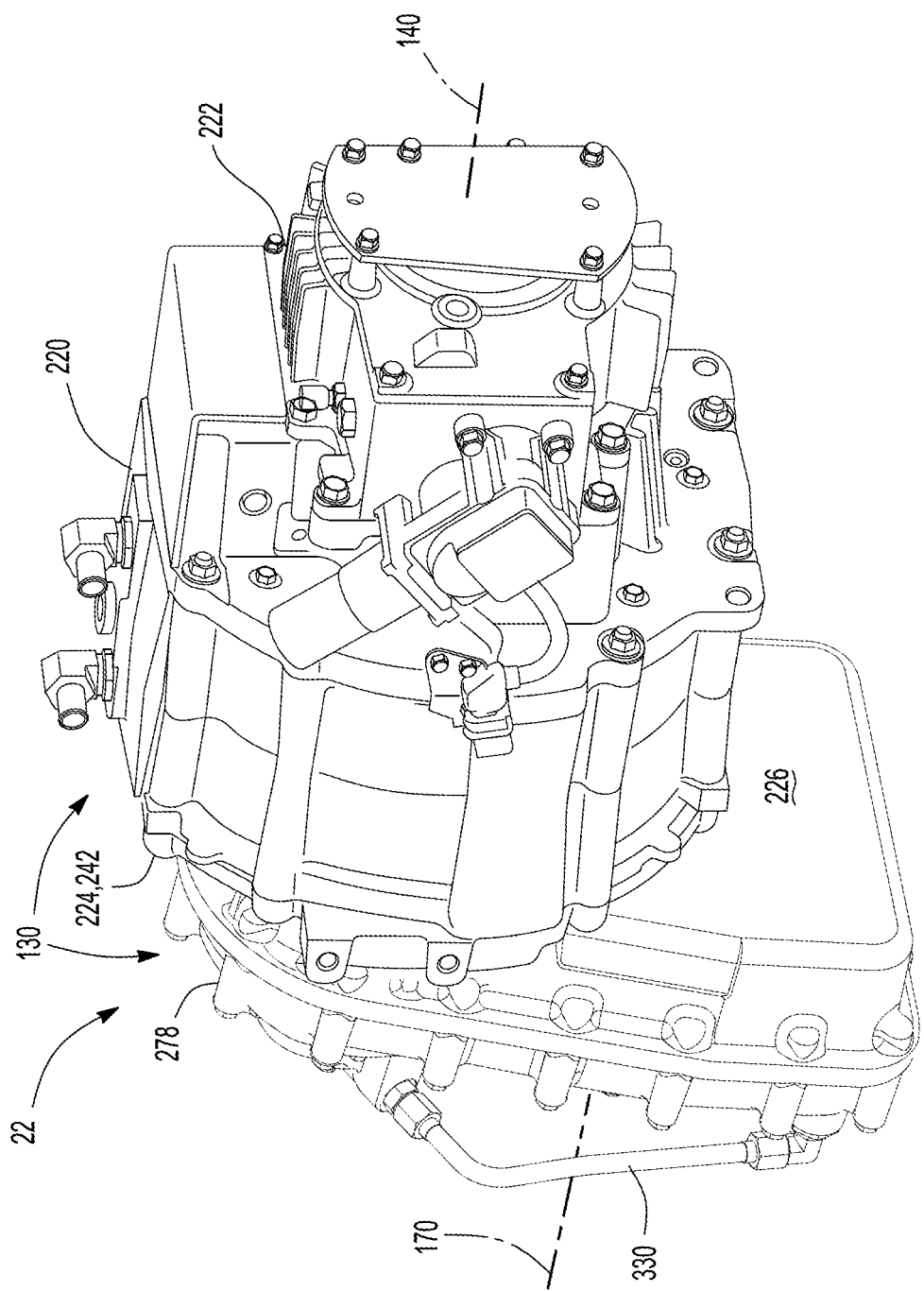
FIG. 2 is a perspective view of the electric drive unit.
Figure 3:
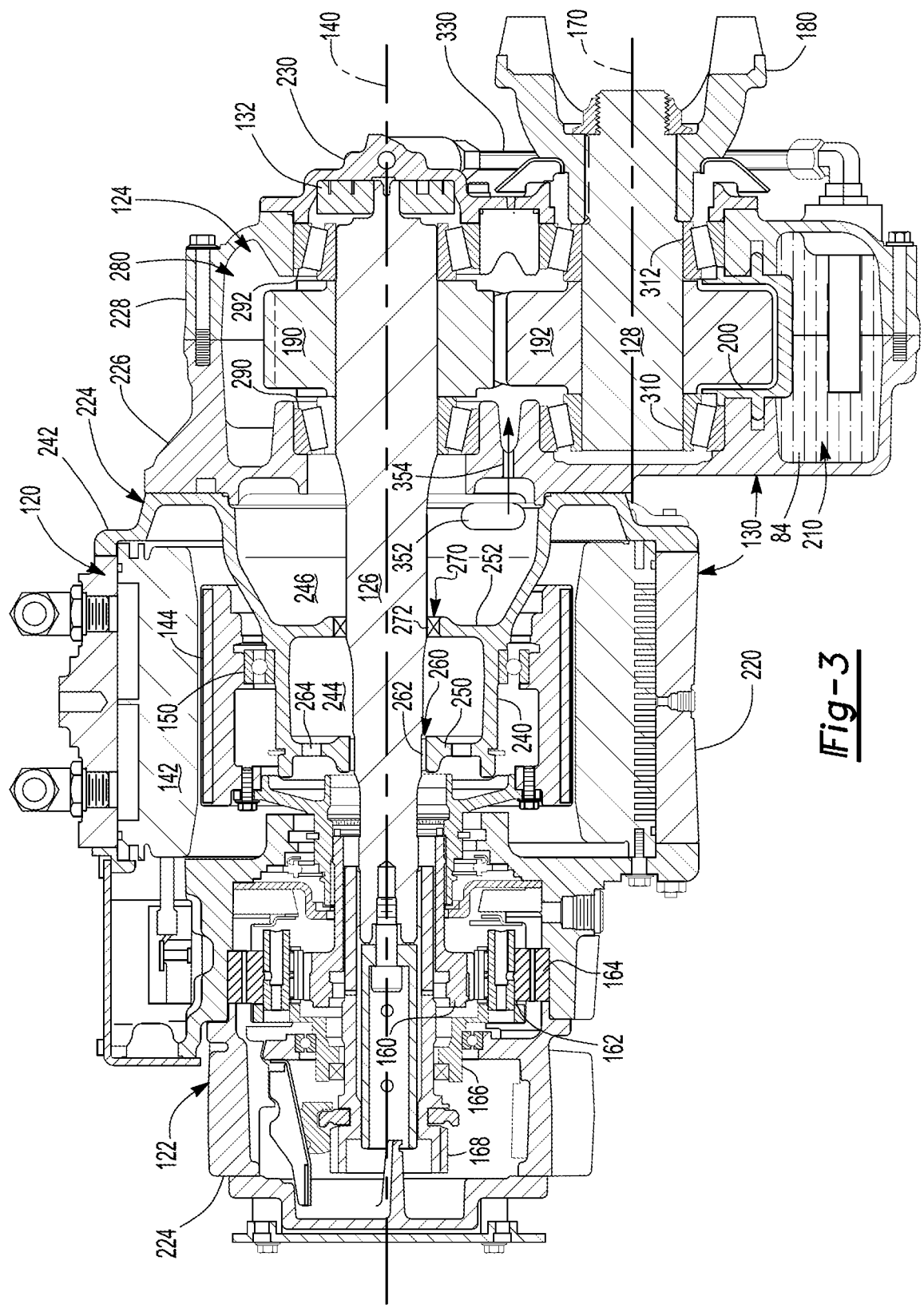
FIG. 3 is a section view of the electric drive unit along section line 3-3.

Referring to FIGS. 2 and 3, perspective and section views of the electric drive unit 22 are shown. In at least one configuration and as is best shown in FIG. 3, the electric drive unit 22 may include an electric motor 120, a transmission 122, a drop gear set 124, a first shaft 126, a second shaft 128, a housing assembly 130, and a lubricant pump 132.

The electric motor 120 may be positioned along a rotor axis 140 between the transmission 122 and the drop gear set 124. The rotor axis 140 may be disposed substantially perpendicular to the differential axis 100. The term "substantially perpendicular" is used herein to designate features or axes that are the same as or very close to perpendicular and includes features that are within ±3° of being perpendicular each other. The electric motor 120 may be electrically connected to the electrical power source via an inverter in a manner known by those skilled in the art. The electric motor 120 includes a stator 142 and a rotor 144.

The stator 142 may be fixedly positioned with respect to the housing assembly 130. The stator 142 may encircle the rotor axis 140 and a rotor 144.

The rotor 144 is rotatable about the rotor axis 140 with respect to the stator 142. The rotor 144 may include material that facilitates the generation of electrical current. The rotor 144 may be rotatably supported on one or more rotor bearings 150.

The transmission 122 operatively connects the rotor 144 and the first shaft 126. As such, the transmission 122 may transmit torque between the electric motor 120 and the differential assembly 52. Torque transmission may be bidirectional. The transmission 122 may provide gear reduction or one or more gear ratios between the rotor 144 and the first shaft 126. The transmission 122 may be of any suitable type. For instance, the transmission 122 may be a countershaft transmission, planetary gear set transmission, or the like. In the configuration shown, the transmission 122 is illustrated as having a planetary gear set that has a sun gear 160, planet gears 162, a planetary ring gear 164, and a planet gear carrier 166. The sun gear 160 may be operatively connected to the rotor 144. The planet gears 162 may mesh with the sun gear 160 and the planetary ring gear 164. The planetary ring gear 164 may encircle the planet gears 162. The planet gear carrier 166 may be rotatable about the rotor axis 140 and may rotatably support the planet gears 162.

A shift collar 168 may selectively couple components of the transmission 122 to the first shaft 126. For instance, the shift collar 168 may be rotatable about the rotor axis 140 with the drive pinion 60 and moveable along the rotor axis 140 with respect to the drive pinion 60 between a first position and a second position in which different components are coupled to or operatively connected to the first shaft 126. In the configuration shown, the shift collar 168 couples the sun gear 160 to the first shaft 126 when in the first position and couples the shift collar 168 couples the planet gear carrier 166 to the first shaft 126 when in the second position, thereby providing different gear ratios.

The first shaft 126 is rotatable about the rotor axis 140. The first shaft 126 may extend through the rotor 144. The first shaft 126 may be rotatably supported by one or more bearing assemblies as will be discussed in more detail below. The shaft 124 does not engage the differential assembly 52 or its ring gear 90.

The second shaft 128 is rotatable about a second shaft axis 170. The second shaft axis 170 may differ from the rotor axis 140. In addition, the second shaft axis 170 may be disposed substantially parallel to the rotor axis 140. The term "substantially parallel" as used herein means the same as or very close to parallel and includes features or axes that are within ±3° of being parallel each other. The second shaft 128 may be operatively connected to the drive shaft 40 as will be discussed in more detail below. As such, the shaft 124 does not engage the differential assembly 52 or its ring gear 90. The second shaft 128 may include a coupling 180 or facilitate mounting of a coupling 180.

The coupling 180 is disposed outside of the housing assembly 130. The coupling 180 may have any suitable configuration. For instance, the coupling 180 may be configured as a yoke or fitting. The coupling 180 may be fixedly disposed on the second shaft 128 and may be connected to the drive shaft 40, such as with universal joint.

The drop gear set 124 operatively connects the first shaft 126 and the second shaft 128. In at least one configuration, the drop gear set 124 includes a first gear 190 and a second gear 192.

The first gear 190 is rotatable about the rotor axis 140 with the first shaft 126. For instance, the first gear 190 may be fixedly disposed on the first shaft 126. The first gear 190 may have a set of teeth that may be arranged around the rotor axis 140 and that may extend away from the rotor axis 140.

The second gear 192 is rotatable about the second shaft axis 170 with the second shaft 128. For instance, the second gear 192 may be fixedly disposed on the second shaft 128. The second gear 192 may have a set of teeth that may be arranged around the second shaft axis 170 and may extend away from the second shaft axis 170. The teeth of the first gear 190 may mesh with the teeth of the second gear 192. The second gear 192 may extend partially into a recess in a separator housing 200.

The separator housing 200 may separate the second gear 192 from lubricant 84 that collects in a sump portion 210 of the housing assembly 130, thereby reducing churning losses that would occur if the second gear 192 was partially submerged in lubricant 84 in the sump portion 210 and rotated through the lubricant 84 in the sump portion 210.

Referring primarily to FIG. 3, the housing assembly 130 receives the electric motor 120, the transmission 122, the drop gear set 124, the first shaft 126, and the second shaft 128. The housing assembly 130 may include a motor housing 220, a transmission housing 222, a support housing 224, a first drop gear housing 226, a second drop gear housing 228, and a first end plate 230.

Referring to FIGS. 2 and 3, the motor housing 220 may be provided with the electric motor 120. The motor housing 220 may encircle the electric motor 120. For instance, the motor housing 220 may encircle the stator 142. In addition, the motor housing 220 may extend from the transmission housing 222 to the support housing 224.

The transmission housing 222 may be provided with the transmission 122. The transmission housing 222 may receive and support the transmission 122. In addition, the transmission housing 222 may receive the shift collar 168 and may support an actuator that may actuate the shift collar 168.

Referring to primarily to FIG. 3 as well as FIGS. 4-8, the support housing 224 may extend from the motor housing 220 to the first drop gear housing 226. A portion of the support housing 224 may be encircled by the rotor 144 and may receive or encircle the first shaft 126. In at least one configuration, the support housing 224 may include a tubular portion 240 and a mounting flange 242. In addition, the support housing 224 may at least partially define a first chamber 244 and a second chamber 246, which are best shown in FIGS. 3 and 9.

Referring primarily to FIG. 3, the tubular portion 240 may encircle the first shaft 126. The rotor 144 may be rotatably disposed on the tubular portion 240. For instance, the rotor bearing 150 may encircle the tubular portion 240 and may rotatably support the rotor 144. In at least one configuration, the tubular portion 240 may include a first internal wall 250 and a second internal wall 252.

The first internal wall 250 may extend toward the rotor axis 140. The first internal wall 250 may define a first opening 260 that may encircle the rotor axis 140 and receive a bearing 262. The bearing 262 may receive and rotatably support the first shaft 126. In addition, the first internal wall 250 may include one or more through holes 264. The through holes 264 may be spaced apart from the first opening 260 and may be arranged around the rotor axis 140.

The second internal wall 252 may be remotely positioned from the first internal wall 250. The second internal wall 252 may extend toward the rotor axis 140. The second internal wall 252 may define a second opening 270 that may receive a seal 272. The seal 272 may extend from the second internal wall 252 to the first shaft 126. The seal 272 may inhibit lubricant 84 from flowing through the second opening 270 between the first chamber 244 and the second chamber 246.

The first chamber 244 may be axially positioned between the first internal wall 250 and the second internal wall 252. In addition, the first chamber 244 may be encircled by the tubular portion 240 of the support housing 224.

The second chamber 246 may be axially positioned between the second internal wall 252 and the first drop gear housing 226. At least a portion of the second chamber 246 may be encircled by the tubular portion 240.

The mounting flange 242 may extend from an end of the tubular portion 240 in a direction that extends away from the rotor axis 140. The mounting flange 242 may be coupled to the motor housing 220 and to the first drop gear housing 226.

Figure 6:
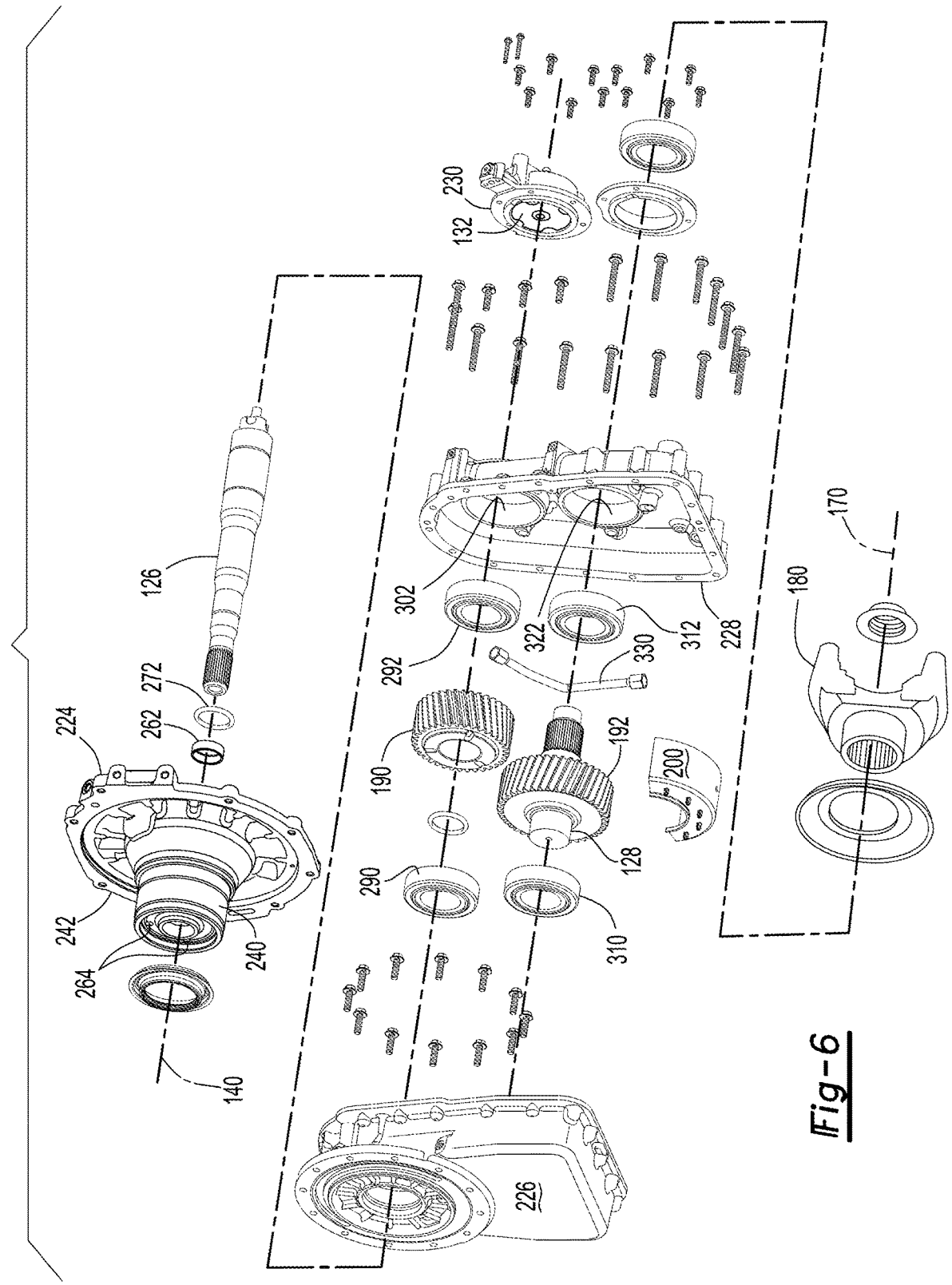
FIGS. 6 and 7 are exploded views of the portion of the electric drive unit shown in FIGS. 4 and 5.
Figure 7:
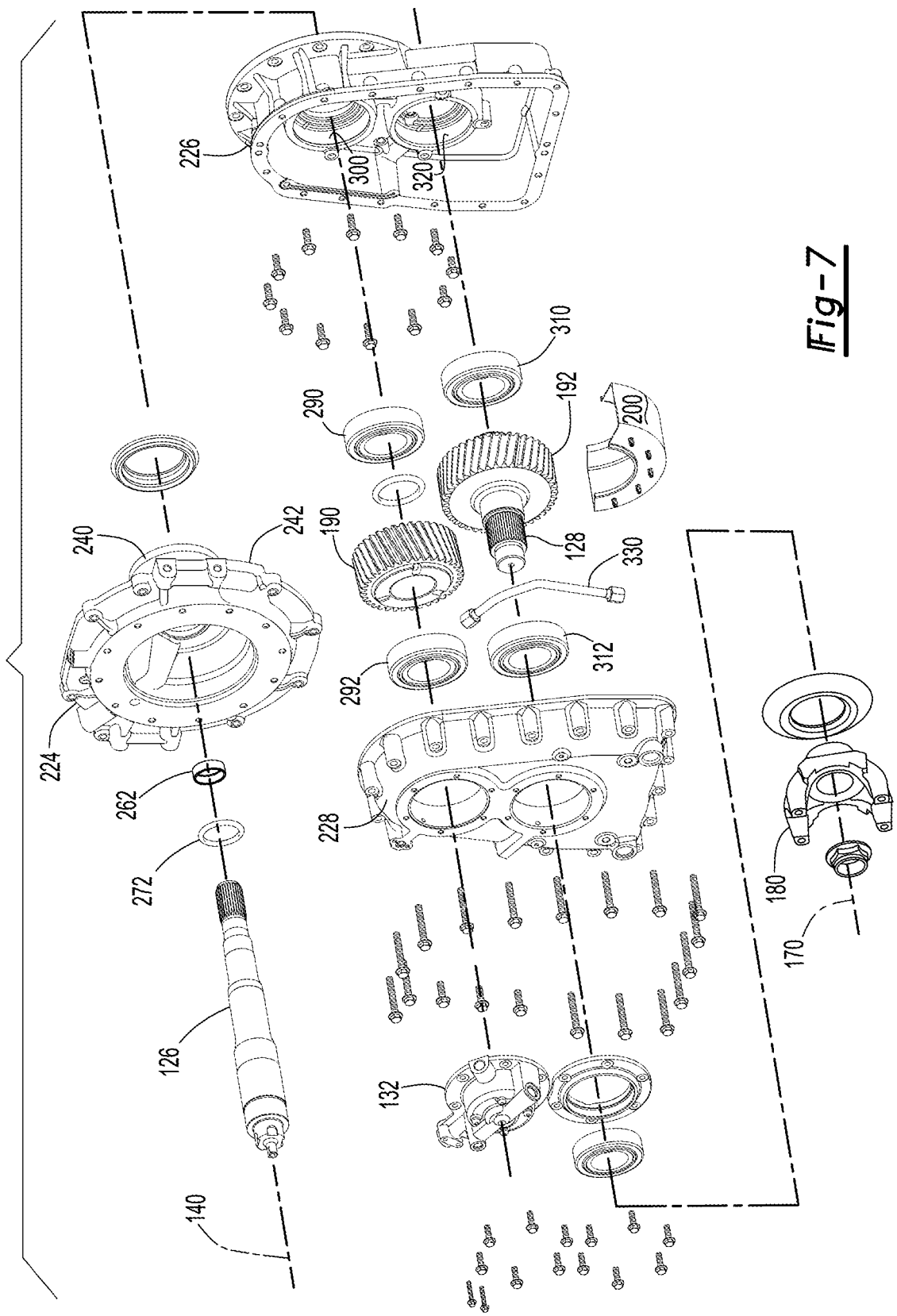

Referring primarily to FIG. 3 as well as to FIGS. 6 and 7, the first drop gear housing 226 may be positioned along the rotor axis 140 between the support housing 224 and the second drop gear housing 228. The first drop gear housing 226 may be mounted to the mounting flange 242 of the support housing 224.

The second drop gear housing 228 may be disposed at an end of the housing assembly 130. The second drop gear housing 228 may be mounted to the first drop gear housing 226 and may be separated from the support housing 224 by the first drop gear housing 226.

Referring to FIG. 3, the first drop gear housing 226 and the second drop gear housing 228 may cooperate to define the sump portion 210 and a cavity 280. The sump portion 210 is disposed at the bottom of the cavity 280 and receives and collects lubricant 84.

The cavity 280 may be positioned between the first drop gear housing 226 and the second drop gear housing 228. The first gear 190 and the second gear 192 of the drop gear set 124 may be disposed in the cavity 280.

The first drop gear housing 226 and the second drop gear housing 228 may support the first shaft 126. For instance, a first bearing assembly 290 may be mounted to the first drop gear housing 226 while a second bearing assembly 292 may be mounted to the second drop gear housing 228. The first bearing assembly 290 and the second bearing assembly 292 may encircle the first shaft 126. In at least one configuration, the first drop gear housing 226 may define a pocket 300, which is best shown in FIG. 7, that may receive a first bearing assembly 290. Similarly, the second drop gear housing 228 may define a pocket 302, which is best shown in FIG. 6, that may receive a second bearing assembly 292. As is best shown in FIG. 3, the first gear 190 may be positioned along the rotor axis 140 between the first bearing assembly 290 and the second bearing assembly 292.

The first drop gear housing 226 and the second drop gear housing 228 may also support the second shaft 128. For instance, a first bearing assembly 310 may be mounted to the first drop gear housing 226 while a second bearing assembly 312 may be mounted to the second drop gear housing 228. The first bearing assembly 310 and the second bearing assembly 312 may encircle the second shaft 128. In at least one configuration, the first drop gear housing 226 may define a pocket 320, which is best shown in FIG. 7, that may receive a first bearing assembly 310. Similarly, the second drop gear housing 228 may define a pocket 322, which is best shown in FIG. 6, that may receive a second bearing assembly 312. As is best shown in FIG. 3, the second gear 192 may be positioned along the rotor axis 140 between the first bearing assembly 310 and the second bearing assembly 312.

Figure 4:
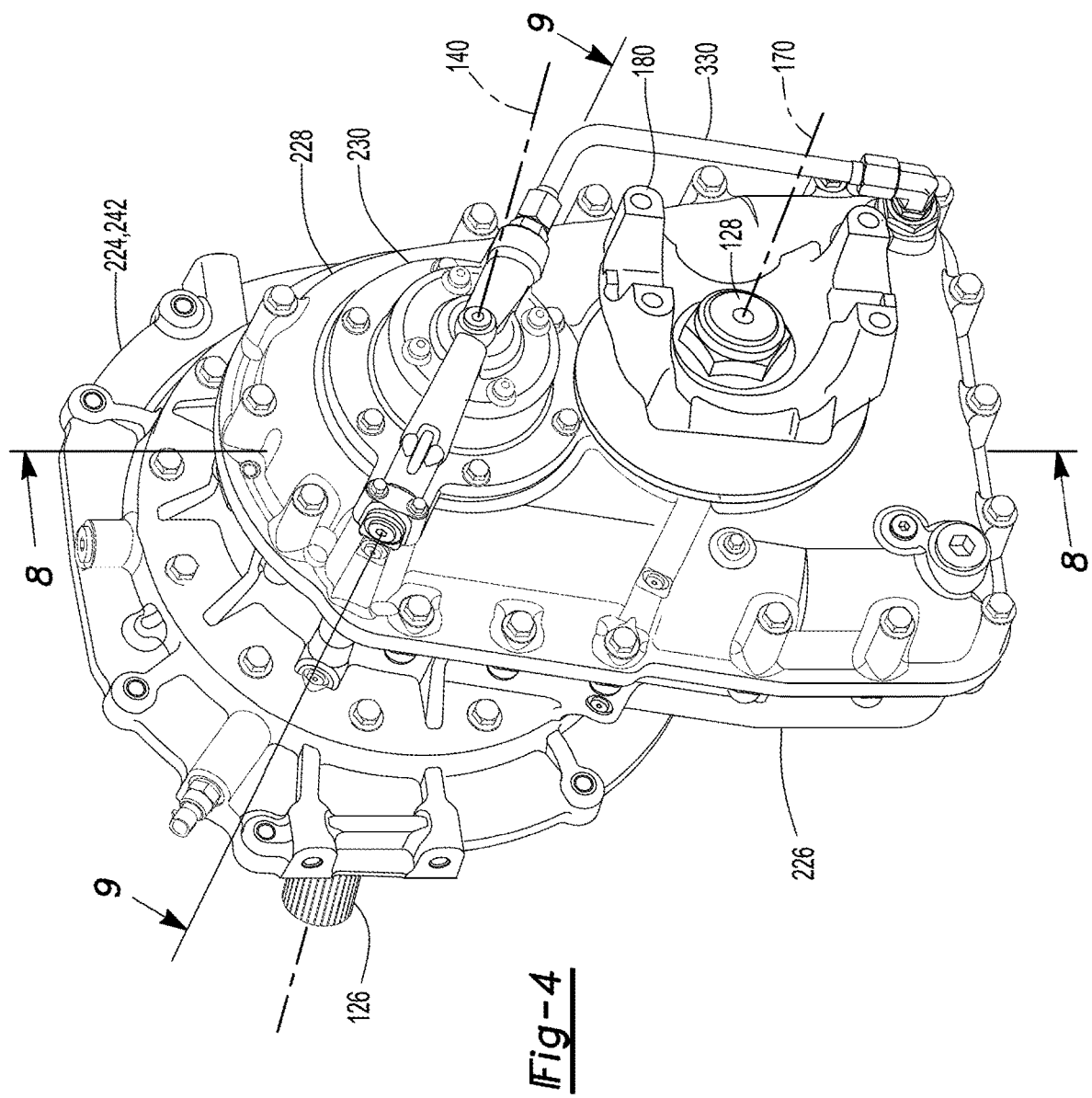
FIGS. 4 and 5 are perspective views of a portion of the electric drive unit.
Figure 5:
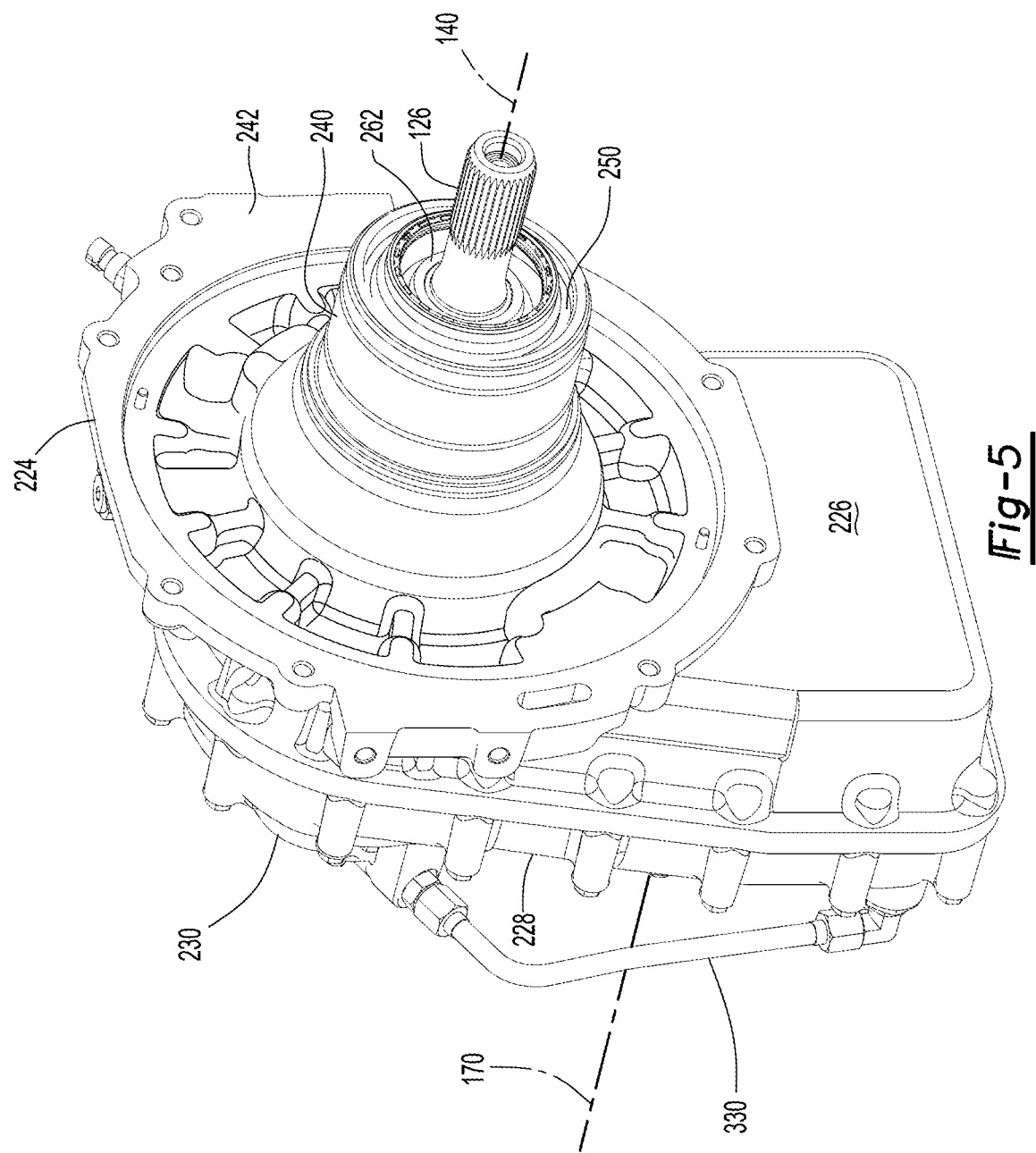

Referring to FIGS. 3, 4, and 6, the first end plate 230 may be disposed along the rotor axis 140. The first end plate 230 may be mounted to the second drop gear housing 228 and may enclose an opening in the second drop gear housing 228. The first end plate 230 may be disposed outside of the second drop gear housing 228 and may facilitate mounting of the lubricant pump 132.

Referring to FIGS. 3 and 6, the lubricant pump 132 pumps lubricant 84 from the sump portion 210 to various components of the electric drive unit 22. For instance, the lubricant pump 132 may pump lubricant 84 to the transmission 122 and various bearings of the axle assembly 20. For instance, lubricant 84 that is pumped by the lubricant pump 132 may be pumped to the bearings that support the first shaft 126. The lubricant pump 132 may be of any suitable type. In the configuration shown, the lubricant pump 132 is configured as a mechanical pump, such as a positive displacement pump like a gerotor pump, that is driven by the first shaft 126. As such, the lubricant pump 132 may pump lubricant 84 when the first shaft 126 rotates.

Figure 8:
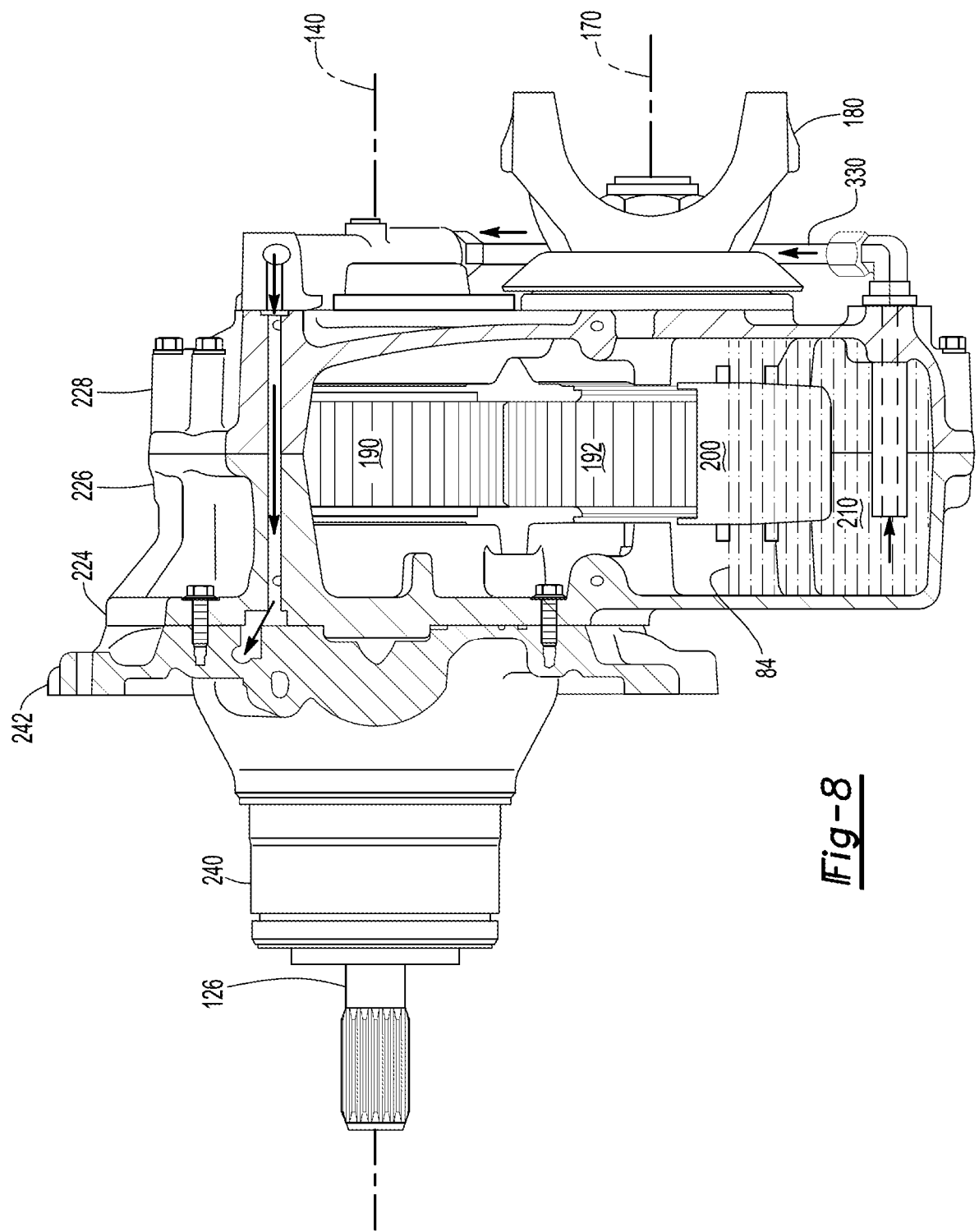
FIG. 8 is a section view of the portion of the electric drive unit along section line 8-8.
Figure 9:
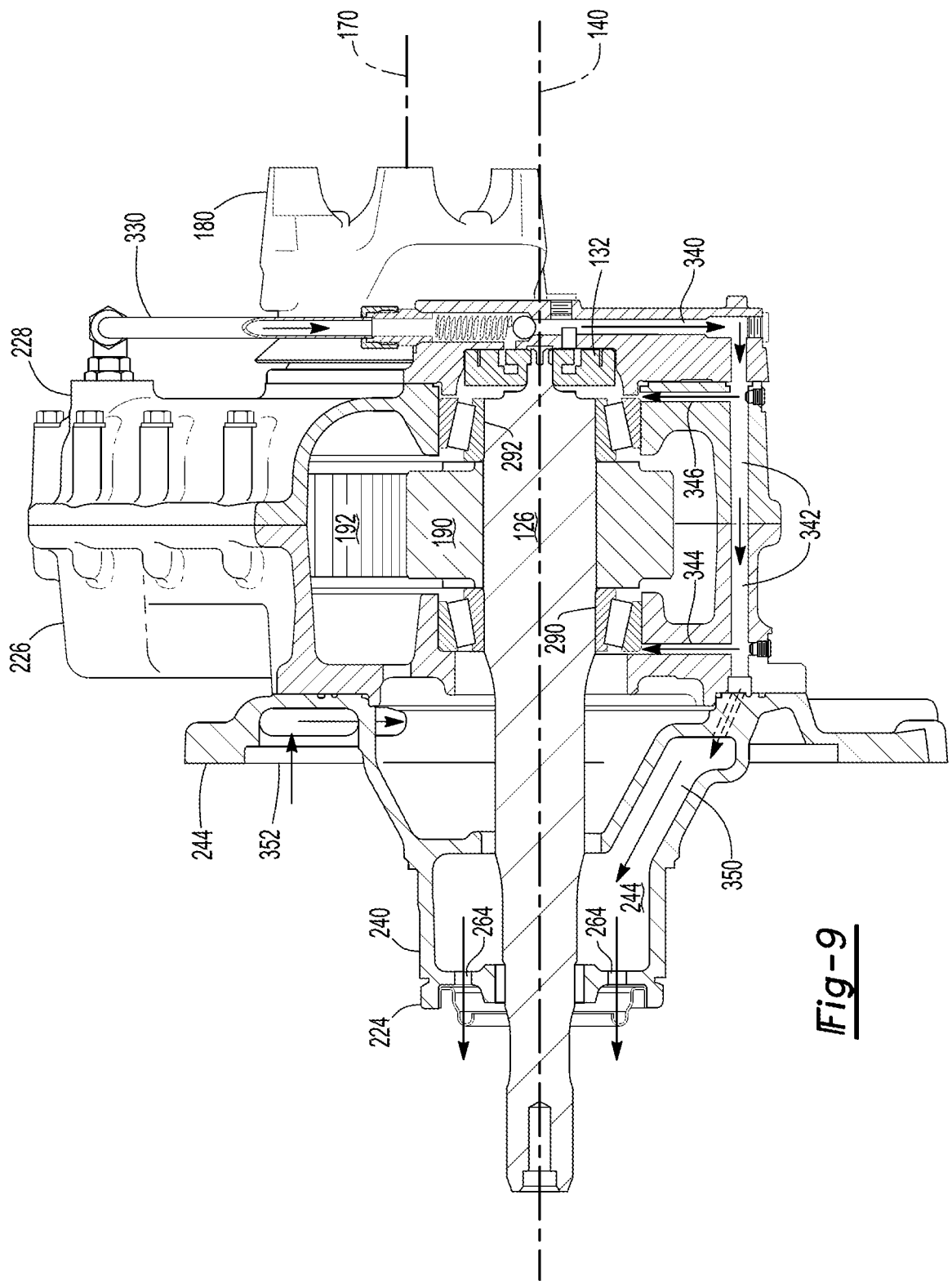
FIG. 9 is a section view of the portion of the electric drive unit along section line 9-9.

Referring to FIGS. 3, 8, and 9, the flow of lubricant 84 in the electric drive unit 22 will now be described. Lubricant flow is represented by unnumbered arrowed lines in these figures.

Starting with FIG. 8, lubricant 84 may flow from the sump portion 210 to the lubricant pump 132 via a conduit 330. The conduit 330 may be fluidly connected to the sump portion 210. The conduit 330 may extend from the second drop gear housing 228 outside of the housing assembly 130 and to the first end plate 230; however, it is also contemplated that the conduit need not be disposed outside of the housing assembly 130.

Referring to FIG. 9, lubricant 84 that exits the lubricant pump 132 may flow through a passage 340. The passage 340 may be disposed in the first end plate 230. The passage 340 may be fluidly connected to a passage 342 that may be defined by the first drop gear housing 226 and the second drop gear housing 228. A first branch 344 may extend from the passage 342 and may supply lubricant 84 to the first bearing assembly 290. The first branch 334 may be defined by the first drop gear housing 226. Similarly, a second branch 346 may extend from the passage 342 and may supply lubricant 84 to the second bearing assembly 292. The second branch 346 may be defined by the second drop gear housing 228. It is contemplated that a similar arrangement may be provided to lubricate the bearing assemblies 310, 312 that support the second shaft 128.

The passage 342 may extend past the first branch 344 (i.e., to the left of the first branch 344 from the perspective shown in FIG. 9) and provide lubricant 84 to the support housing 224. For example, lubricant 84 may flow from the passage 342 through a corresponding passage 350 in the support housing 224 and to the first chamber 244. Lubricant 84 may then flow from the first chamber 244 through one or more through holes 264 in the first internal wall 250. Lubricant 84 that passes through the through holes 264 may then flow to the transmission 122 to lubricate its associated components.

Lubricant 84 may flow from the transmission 122 back to the sump portion 210 along a different path. For instance, lubricant 84 may flow from the transmission housing 222 through a passage in the motor housing 220. The passage in the motor housing 220 may be disposed between the exterior of the motor housing 220 and the stator 142 and may extend from an end of the motor housing 220 that is adjacent to the transmission housing 222 to an opposite end of the motor housing 220 that is adjacent to the mounting flange 242 of the support housing 224.

As is best shown in FIGS. 3 and 9, lubricant 84 may enter an inlet 352 in the support housing 224 and direct lubricant 84 into the second chamber 246. As is best shown in FIG. 3, lubricant 84 may pass from the second chamber 246 through a passage 354 in the first drop gear housing 226 that may be located below the first shaft 126, thereby allowing lubricant 84 to flow back to the sump portion 210 due to the force of gravity.

An electric drive unit as described above may allow a vehicle having an internal combustion engine to be retrofitted or replaced with an electric drive or electric propulsion system without replacing or altering the axle assembly, thereby reducing the time and associated costs needed to retrofit a vehicle. Moreover, present invention may allow the electric drive unit to be remotely positioned from the axle assembly so that available space in the vehicle may be utilized to accommodate the electric drive unit, thereby reducing alterations to the vehicle. Moreover, the electric drive unit may provide design flexibility in new vehicles. For instance, by providing the electric drive unit remotely from the axle assembly a wider variety of locations may be used to package the electric drive unit as compared to designs in which an electric motor is directly mounted to the axle assembly or is provided adjacent to the vehicle wheels.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system comprising:
   an electric drive unit that includes:
      an electric motor having a rotor that is rotatable about a rotor axis;
      a first shaft that is rotatable about the rotor axis;
      a transmission that operatively connects the rotor and the first shaft;
      a second shaft that is rotatable about a second shaft axis that differs from the rotor axis; and
      a drop gear set that has a first gear that is rotatable about the rotor axis with the first shaft and a second gear that meshes with the first gear and is rotatable about the second shaft axis with the second shaft;
   an axle assembly that is remotely positioned from the electric drive unit, the axle assembly including an axle housing assembly that receives a differential assembly and a drive pinion that meshes with a ring gear of the differential assembly; and
   a drive shaft that operatively connects the second shaft to the drive pinion.

2. The drive axle system of claim 1 wherein the electric drive unit has a housing assembly that receives the electric motor, the first shaft, the transmission, the second shaft, and the drop gear set.

3. The drive axle system of claim 2 wherein the drive shaft is disposed outside of the housing assembly of the electric drive unit and outside of the axle housing assembly of the axle assembly.

4. The drive axle system of claim 1 the electric drive unit is received in an engine compartment of a vehicle and the axle assembly is disposed rearward of the engine compartment of the vehicle.

5. An electric drive unit comprising:
   an electric motor having a rotor that is rotatable about a rotor axis;
   a first shaft that extends through the rotor and that is rotatable about the rotor axis;
   a transmission that operatively connects the rotor and the first shaft;
   a second shaft that is rotatable about a second shaft axis that differs from the rotor axis;
   a drop gear set that has a first gear that is rotatable about the rotor axis with the first shaft and a second gear that meshes with the first gear and is rotatable about the second shaft axis with the second shaft;
   a housing assembly that receives the electric motor, the first shaft, the transmission, the second shaft, and the drop gear set; and a coupling that is fixedly disposed on the second shaft outside of the housing assembly.

6. The electric drive unit of claim 5 wherein the electric motor is positioned along the rotor axis between the transmission and the drop gear set.

7. The electric drive unit of claim 5 wherein the housing assembly includes a support housing that is encircled by the rotor and that receives the first shaft.

8. The electric drive unit of claim 7 wherein the support housing includes a tubular portion that encircles the first shaft and a mounting flange that extends from an end of the tubular portion in a direction that extends away from the rotor axis, wherein the rotor is rotatably disposed on the tubular portion.

9. The electric drive unit of claim 8 wherein the tubular portion includes a first internal wall that extends toward the rotor axis and that defines a first opening that receives a bearing that receives and rotatably supports the first shaft.

10. The electric drive unit of claim 9 wherein the tubular portion includes a second internal wall that extends toward the rotor axis and that is remotely positioned from the first internal wall, wherein the second internal wall defines a second opening that receives a seal that extends from the second internal wall to the first shaft.

11. The electric drive unit of claim 7 wherein the housing assembly includes a first drop gear housing and a second drop gear housing that cooperate to define a gear cavity that receives the first gear and the second gear.

12. The electric drive unit of claim 11 wherein the first drop gear housing is positioned along the rotor axis between the support housing and the second drop gear housing, the first drop gear housing is mounted to a mounting flange of the support housing, and the second drop gear housing is mounted to the first drop gear housing and is separated from the support housing by the first drop gear housing.

13. The electric drive unit of claim 11 further comprising a first bearing assembly and a second bearing assembly that rotatably support the first shaft, wherein the first gear is positioned along the rotor axis between the first bearing assembly and the second bearing assembly.

14. The electric drive unit of claim 13 wherein the first bearing assembly is mounted to the first drop gear housing and the second bearing assembly is mounted to the second drop gear housing.

15. The electric drive unit of claim 12 further comprising a first bearing assembly and a second bearing assembly that rotatably support the second shaft, wherein the second gear is positioned along the second shaft axis between the first bearing assembly and the second bearing assembly.

16. The electric drive unit of claim 15 wherein the first bearing assembly is mounted to the first drop gear housing and the second bearing assembly is mounted to the second drop gear housing.

17. The electric drive unit of claim 13 wherein the first drop gear housing and the second drop gear housing cooperate to define a sump portion that receives lubricant and wherein the electric drive unit further comprises a lubricant pump that is driven by the first shaft and the pumps lubricant from the sump portion to a first end plate that is mounted to the second drop gear housing.

18. The electric drive unit of claim 17 wherein a conduit is fluidly connected to the sump portion and extends outside of the housing assembly to the first end plate.

19. The electric drive unit of claim 17 wherein the lubricant pump pumps lubricant through a passage in the first end plate to a passage in the second drop gear housing and then to a passage in the first drop gear housing to provide lubricant to the first bearing assembly and to a first chamber inside the support housing.

20. The electric drive unit of claim 19 wherein the support housing includes a first internal wall and a second internal wall that extend toward the first shaft and cooperate to at least partially define the first chamber and the support housing at least partially defines a second chamber that is disposed between the second internal wall and the first drop gear housing, wherein lubricant flows from the transmission and through the second chamber to reach the sump portion.

* * * * *